E. F. EDGECOMBE, Jr.
METERING PANEL.
APPLICATION FILED NOV. 6, 1916.

1,276,043.

Patented Aug. 20, 1918.
4 SHEETS—SHEET 1.

WITNESSES:
Frank A. Sable
Josephine Gasper

INVENTOR
Edward F. Edgecombe Jr.,

BY
Hood & Achley.
ATTORNEYS

E. F. EDGECOMBE, Jr.
METERING PANEL.
APPLICATION FILED NOV. 6, 1916.

1,276,043.

Patented Aug. 20, 1918.
4 SHEETS—SHEET 4.

WITNESSES:
Frank A. Fahle
Josephine Gasper

INVENTOR
Edward F. Edgecombe Jr.,

BY
Hood & Schley.
ATTORNEYS

UNITED STATES PATENT OFFICE.

EDWARD F. EDGECOMBE, JR., OF LA GRANGE, ILLINOIS.

METERING-PANEL.

1,276,043.

Specification of Letters Patent.

Patented Aug. 20, 1918.

Application filed November 6, 1916. Serial No. 129,679.

*To all whom it may concern:*

Be it known that I, EDWARD F. EDGECOMBE, Jr., a citizen of the United States, residing at La Grange, in the county of Cook and State of Illinois, have invented a new and useful Metering-Panel, of which the following is a specification.

It is the object of my invention to provide a metering panel, which makes possible the ready connecting of different circuits in different groupings to different meters or all to a common meter, which will meet all ordinary requirements which experience has shown to be encountered in actual practice, and which is simpler and less expensive in construction than the metering panels now in use.

Figure 1:
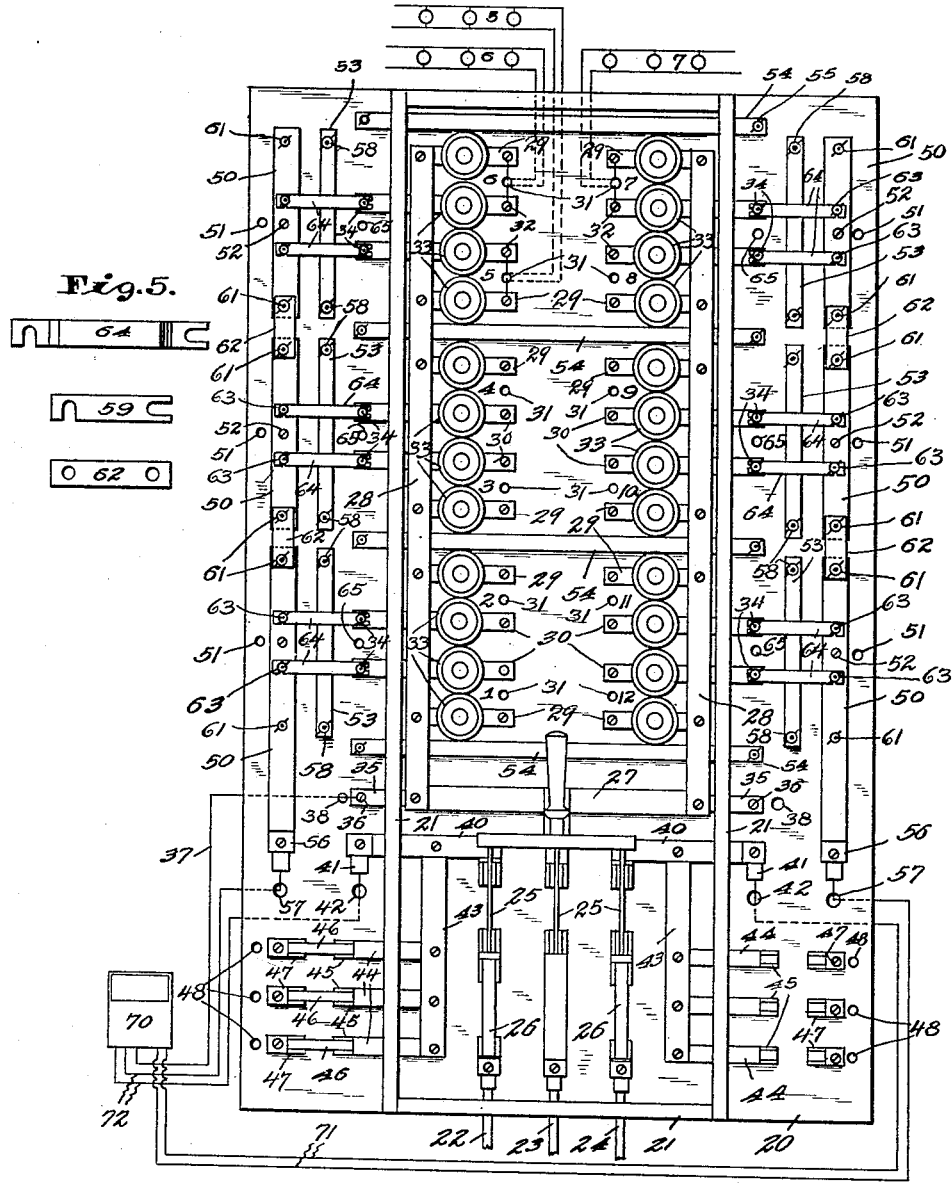
Figure 2:
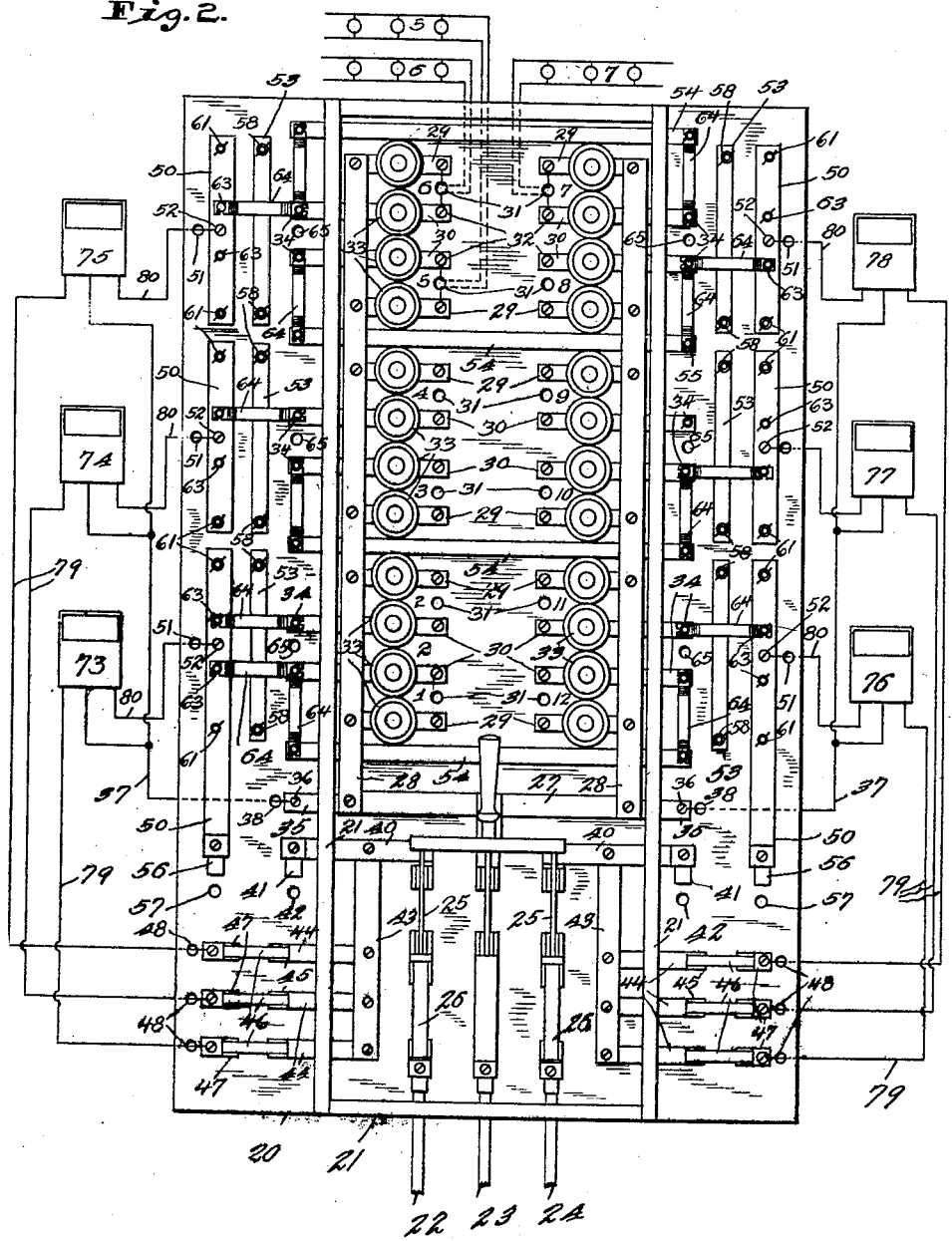
Figure 3:
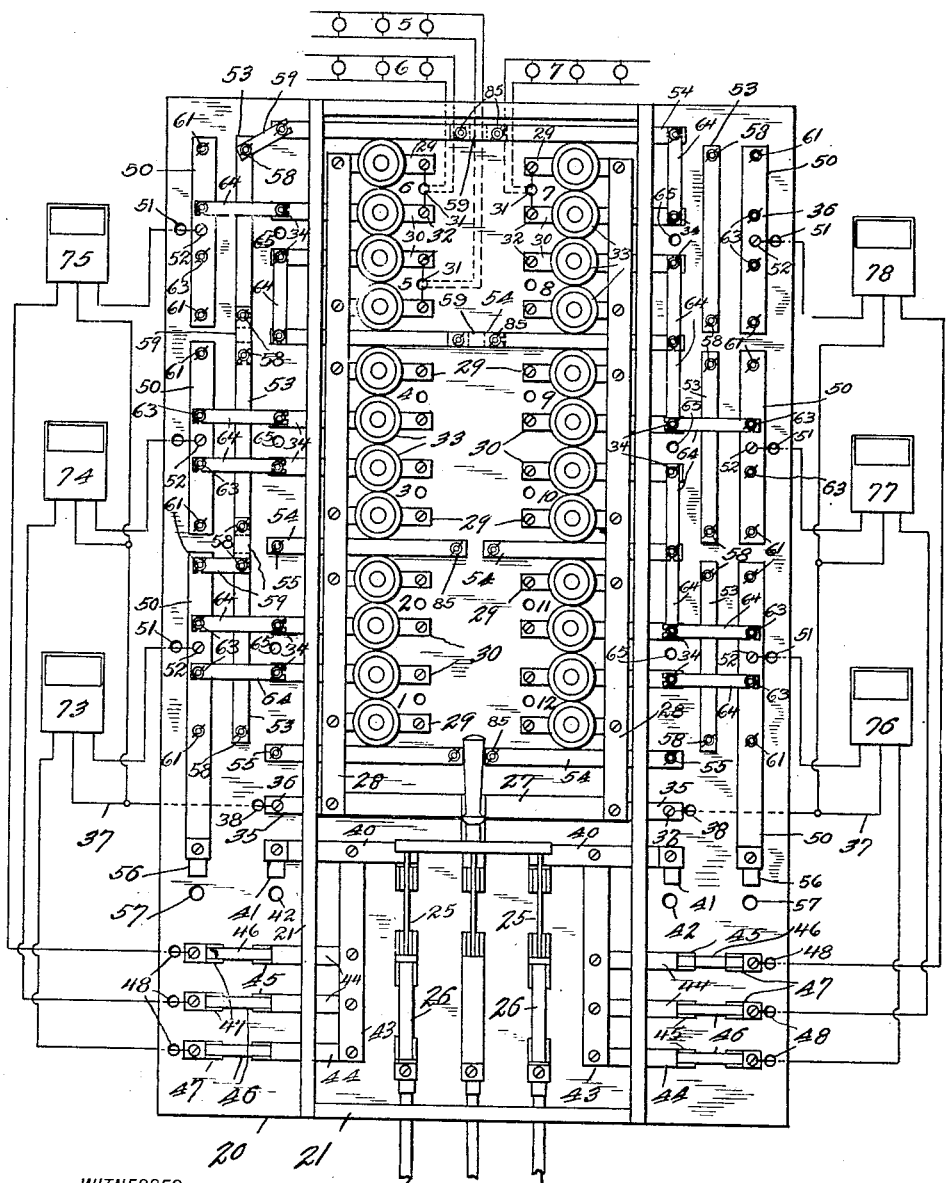
Figure 4:
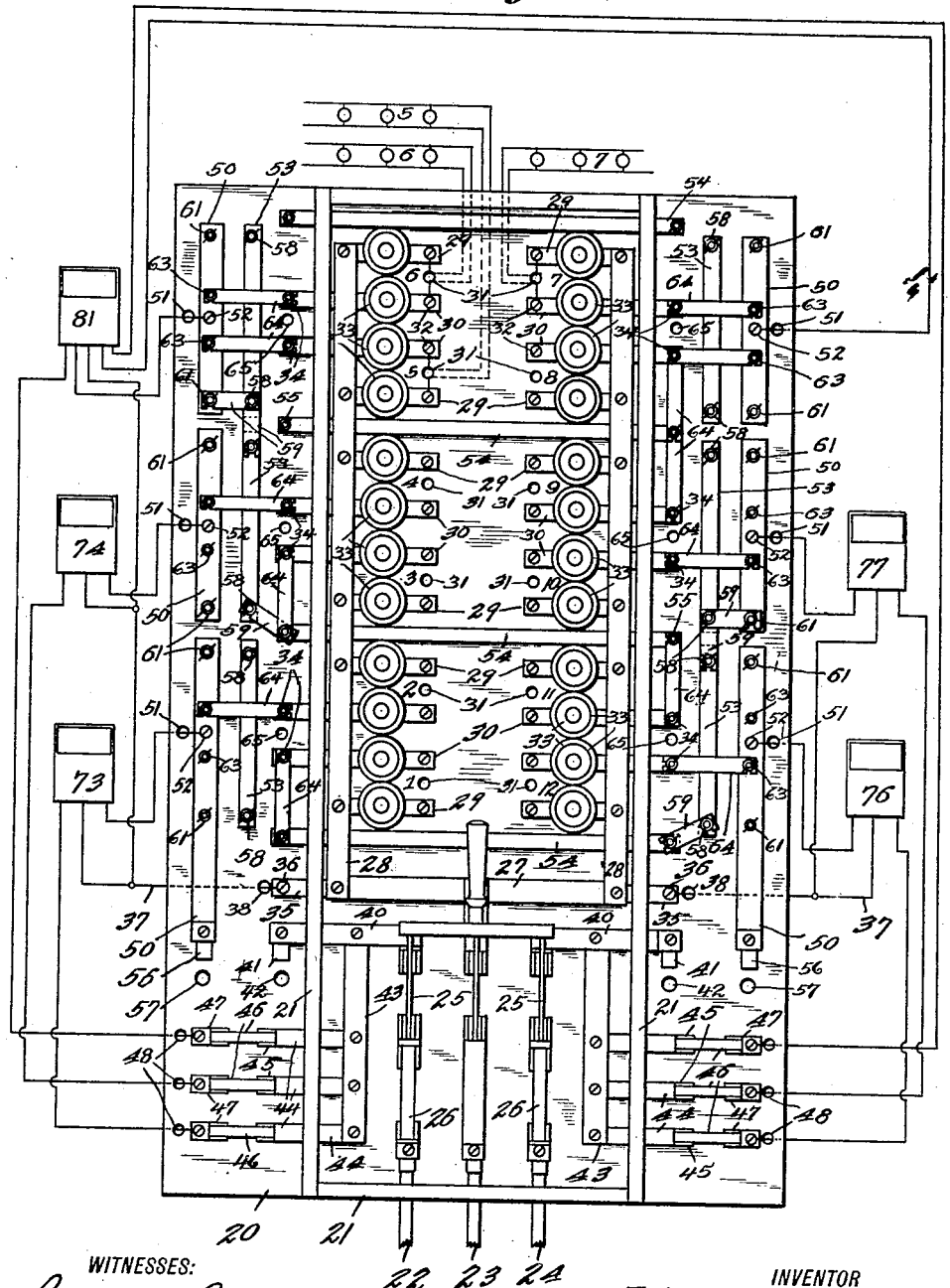

The accompanying drawings illustrate my invention, showing a few of the many possible combinations of connections which are obtainable. Figure 1 is an elevation of a three-wire metering panel embodying my invention, showing the connections for metering all the circuits by a single three-wire meter; Figs. 2 and 3 are views similar to Fig. 1, showing the same three-wire metering panel with the circuits connected in two different arrangements singly and in different groups to six two-wire meters, one of the meters in Fig. 3 being not in use; Fig. 4 is a view similar to Fig. 1, showing the same three-wire metering panel with the circuits connected singly and in groups to four two-wire meters and one three-wire meter; and Fig. 5 is a view showing the several cross connecting straps used.

The metering panel has an insulating base 20, from which projects forward insulating barriers 21 at the top and bottom edges and parallel to but at a distance from the side edges, to provide a central distributing compartment between two side meter-connecting compartments, each extending the whole height of the panel.

The three main supply leads 22, 23, and 24 of the three-wire supply circuit are led in at the bottom to the main three-wire switch 25, fuses 26 being included in the outside supply leads 22 and 24 before the switch 25 is reached, though not necessarily in the neutral lead 23.

On the distributing side of the main switch 25, the neutral contact point is connected to a cross bar 27, which is connected to one or more vertical bars 28 extending therefrom within the central compartment almost to the top of the panel. The vertical bar or bars 28 are connected to one connecting bar 29 of the two connecting bars 29 and 30 of each of the distributing circuits, of which twelve are shown, numbered from 1 to 12 inclusive. These connecting bars for the circuits are arranged in two vertical series, those for circuits 1 to 6 at the left and those for circuits 7 to 12 at the right, within said central distributing compartment; and in the arrangement shown there are two vertical bars 28, one at each side of such central compartment, thereby leaving the entire vertical central portion of such central compartment open, for the more convenient connection of the various distributing circuits (of which to avoid confusion only circuits 5, 6, and 7 are shown) to their respective connecting bars 29 and 30. The leading-out wires to these circuits are located behind the panel 20, and project up therethrough through holes 31, of which there is one between the connecting bars 29 and 30 for each circuit, for connection to the inner ends of such connecting bars by attaching screws 32. Each connecting bar 29 and 30 is preferably provided with the usual screw fuse plug 33, thereby providing the fuses for the individual circuits. The connecting bars 30 extend beneath the vertical barriers 21 into the side compartments, and are there provided with thumb screws 34, which are arranged in a vertical row near the inner edge of each side compartment. The bar 27 is provided with extensions 35 which also project under the vertical barriers 21 and are provided at their ends with screws 36 for connection to the potential wires of the associated meter or meters, which potential wires 37 pass out through holes 38 in the base 20.

Each outside contact point of the switch 25 on its distributing side is connected to a bar 40, which projects beneath the adjacent vertical barrier 21 and is provided at its end with a connecting clip 41, for use when all the circuits are connected to a single meter, as shown in Fig. 1, a hole 42 being provided beside each clip 41 to allow the passage of the meter wire. Each bar 40 is also connected to a vertical bar 43, in turn connected to a plurality of bars 44 projecting beneath the adjacent barrier 21 into the side compartment and there provided with fuse clips 45 by which they may be connected by fuses 46 to similar clips on meter connection bars 47 provided with suitable screws for connection to the wires leading to the meters through holes 48 in the base 20. I find that ordinarily the number of bars 44 connected to each outside wire of the three-wire supply circuit need be but about one-fourth the total number of distributing circuits, or one-half the number of circuits on each side of the system; though this proportion is not essential.

Near the outer edge of each side compartment there is a series of vertical meter bars 50, arranged in a row, and close to each of these bars 50 is a hole 51 through the base 20 to allow the passage therethrough of a meter wire which may be connected to such meter bar by a connecting screw 52. A vertical transfer bar or series of bars 53 is located between each row of meter bars 50 and the adjacent ends of the bars 30; as shown, there is a series of these vertical transfer bars 53 in each side compartment, but if desired these can all be connected to form virtually a single bar by the connections hereinafter described, as is shown in Fig. 2. A number of horizontal transfer bars 54 extend from one side compartment across the central compartment to the other side compartment, passing beneath both the vertical barriers 21, and at their ends are provided with thumb screws 55 in the same vertical lines as the thumb screws 34. Conveniently, a sufficient number of horizontal transfer bars 54 is provided so that between each transfer bar and the next there are the connecting bars 29 and 30 for but two circuits in each vertical row, with one bar at the top and one at the bottom of these rows, as thereby the connecting bars of each circuit are directly beside a transfer bar, either above or below. This is found in the arrangement shown, where there is a horizontal transfer bar 54 at the top, another between the connecting strips for the circuits 5 and 8 and the circuits 4 and 9, another between the connecting bars for the circuits 3 and 10 and the circuits 2 and 11, and a fourth at the bottom. The gaps between adjacent meter bars 50, as well as those between adjacent vertical transfer bars 53 when there is a series of such vertical transfer bars instead of a single one in each side compartment, come opposite the ends of the horizontal transfer bars 54, the lowermost meter bars 50 extending downward past the lowermost horizontal transfer bar 54 and terminating in connection clips 56 for connection to wires which pass through adjacent holes 57 in the base 20 to the associated meter when the whole number of circuits is connected to a single meter, as shown in Fig. 1. On each end of each vertical transfer bar 53 there is mounted a thumb screw 58, all of which thumb screws are equidistant from the nearest thumb screws 55 on the ends of the horizontal transfer bars 54, so that they may be interconnected with the latter thumb screws by interchangeable transfer straps 59, of uniform length. The distance between thumb screws 58 at adjacent ends of the vertical transfer bars 53 is the same as that between such thumb screws and the thumb screws 55, so that adjacent vertical transfer bars 53 may be interconnected by the same transfer straps 59, which may be clamped in place by these same thumb screws 58. The meter bars 50 are provided with thumb screws 61 which are at the same distance from corresponding thumb screws 58 as the thumb screws 58 are from the thumb screws 55, so that the same transfer straps 59 may also be used to connect the thumb screws 58 and 61 (and thereby the vertical transfer bars 53 and meter bars 50) as are used to interconnect the thumb screws 55 and 58 (and thereby the horizontal and vertical transfer bars). Adjacent meter bars 50 may be interconnected by totalizing straps 62, coöperating with the thumb screws 61, and the thumb screws 61 at adjacent ends of adjacent meter bars 50 are preferably the same distance from each other as they are from the corresponding thumb screws 58, so that if desired the same straps may be used for totalizing straps and for transfer straps. Preferably, however, slightly heavier straps are used for totalizing straps. The meter bars 50 are also provided with thumb screws 63 opposite the thumb screws 34, so that such thumb screws 34 and 63 (and thereby the corresponding connecting bars 30 and meter bars 50) may be interconnecting by circuit straps 64 which coöperate with such thumb screws and span the intermediate vertical transfer bars 53, having a raised central portion so that they will clear such vertical transfer bars. The thumb screws 34 are equidistant from the thumb screws 63 and 55, so that the same circuit straps 64 may also be used to interconnect the thumb screws 34 with the thumb screws 55, thereby joining the connecting bars 30 with the horizontal transfer bars 54. In order to provide this equidistant arrangement economically, the bars 29 and 30 are arranged oppositely for alternate circuits in each of the two vertical rows, as clear from the drawings, the connecting bars 30 being above the connecting bars 29 for circuits 1, 3, 5, 8, 10, and 12 and below them for the remaining circuits. Preferably holes 65 are provided between the outer ends of the bars 30 where they are adjacent, to permit the passage of meter wires therethrough direct to the thumb screws 34 should that be desirable at any time, though in none of the arrangements shown are these holes used.

The meters may be connected to the different circuits in various manners, providing great flexibility, and permitting practically all combinations of circuits to be made which are ordinarily required in actual practice. In the arrangement shown in Fig. 1 there is a single three-wire meter 70, to which are connected the potential wire 37 leading from the extension 35 of the cross bar 27, the circuit wires 71 leading respectively to the clips 41 and 56 for one side of the system, and the circuit wires 72 leading respectively to the clips 41 and 56 for the other side of the system. The meter bars 50 in each side compartment are all connected by totalizing straps 62. The connecting bars 30 of all the circuits are connected, by the thumb screws 34, circuit straps 64, and thumb screws 63, to such meter bars. By these connections the meter 70 measures the load on all the circuits, from 1 to 12 inclusive. These connections are made by the use of totalizing straps and circuit straps only. No transfer straps 59 are necessary, and neither the vertical nor horizontal transfer bars are used. This would be the system of connections, for instance, when all the rooms on the floor of a building are leased to a single concern.

In the arrangement shown in Fig. 2, there are six two-wire meters 73, 74, 75, 76, 77, and 78, each of which has its potential contact connected to the potential wire 37, its incoming current wire 79 to one of the meter connection bars 47, and its outgoing wire 80 to one of the meter bars 50, three of these meters being on one side of the three-wire system and three on the other. By proper use of circuit straps 64, and without requiring the use of totalizing straps 62 or transfer straps 59, circuits 1, 2, and 12 are connected to meter 73, circuit 4 alone to meter 74, circuits 6 and 7 to meter 75, circuit 11 alone to meter 76, circuits 3 and 10 to meter 77, and circuits 5 and 8 to meter 78, circuit 9 being not in use; if it is desired to use circuit 9 in addition, separately, an additional meter can be provided and its current wire properly connected to the thumb screw 34 of the connecting bar 30 of such circuit after passing through the adjacent hole 65. This uses the horizontal transfer bars 54, but none of the vertical transfer bars 53.

In the arrangement shown in Fig. 3, there are likewise six two-wire meters 73, 74, 75, 76, 77, and 78, connected in the same manner as in Fig. 2 to the incoming supply line and the several meter bars 50. By proper use of circuit straps 64 and transfer straps 59, but without requiring any totalizing straps, circuits 1, 2, and 7 are connected to meter 73, circuits 3 and 4 to meter 74, circuit 6 alone to meter 75, circuits 10, 11, and 12 to meter 76, and circuits 5, 8, and 9 to meter 77, meter 78 not being in use. Some of the horizontal and vertical transfer bars are in use in this arrangement, but not all of them.

In the arrangement shown in Fig. 4, there are four two-wire meters 73, 74, 76, and 77 which are connected to the main supply circuit and to the corresponding meter bars 50 in the same manner as are the corresponding meters in Figs. 2 and 3, and one three-wire meter 81 which has its potential wire connected as are the potential wires of the other meters and its two sets of current wires connected as are the current wires of the meters 75 and 78 in the arrangements shown in Figs. 2 and 3. By proper use of circuit straps 64 and transfer straps 59, but without requiring any totalizing straps, circuit 2 alone is connected to meter 73, circuit 4 alone to meter 74, circuit 12 alone to meter 76, circuits 1 and 10 to meter 77, and circuits 3, 5, 6, 7, 8, 9, and 11 to meter 81, circuits 3, 5, 6, and 11 being across one side of the three-wire system and circuits 7, 8, and 9 across the other side of such system in their connection to the meter 81. In this arrangement some of the horizontal transfer bars are used, and vertical transfer bars in both side compartments are used.

A great number of other combinations of circuits can be obtained with my metering panel by the use of the various straps and transfer bars, and practically every combination ordinarily required is obtainable. Yet this metering panel is extremely simple and inexpensive to construct, in comparison with other metering panels.

The horizontal transfer bars 54 either may be continuous from one side compartment across a central compartment to the other side compartment, as shown in Figs. 1, 2, and 4, or may be divided centrally, to provide two separable parts, as shown in Fig. 3. In the latter case, the adjacent ends of these two separable parts are provided with thumb screws 85, conveniently spaced apart by the same distance as that which separates the thumb screws 58 from the adjacent thumb screws 55 or 61, so that the thumb screws 85 at the adjacent ends of the two parts of a horizontal transfer bar 54 may be interconnected by the same transfer straps 59 as are used for interconnecting the other thumb screws mentioned. By thus interconnecting the two parts of a horizontal transfer bar 54, it becomes in effect a continuous bar, as shown in the other figures, and may be thus used when it is desired to connect to the same meter circuits on different sides of the metering panel. However, by making the horizontal transfer bars 54 in separable parts, an added flexibility is obtained. Thus, in the arrangement shown in Fig. 3, the circuits 10, 11, and 12 are all connected to the meter 76, and for this connection the right hand half of the third horizontal transfer bar 54 from the top is used as an intermediate point of connection for the circuit straps 64 which connect connecting bars 30 of the circuits 10 and 11; but this third horizontal transfer bar 54 is not performing any function of interconnecting circuits on the two sides of the metering panel, so that it may be separated into its two parts, as shown, by removing the transfer strap 59 which would connect its adjacent ends when it is used for transfer purposes, whereby its left hand half is not connected to any of the circuits at the right hand side of the metering panel. Thus, such left hand half of this third horizontal transfer bar 54 from the top is rendered available for use if it should be desired, for instance, to connect circuits 1, 2, and 3 to the meter 73, in a manner corresponding to that in which the circuits 10, 11, and 12 are connected to the meter 76. This is made possible by the fact that the horizontal transfer bars are thus divisible, for if they were not the making of these connections would involve an interconnection of the circuits connected to the meters 73 and 76, and a short-circuiting of the system.

I claim as my invention:

1. A metering panel, comprising a plurality of connecting bars for the several circuits, said connecting bars being arranged in a plurality of rows, meter bars arranged in rows parallel to and flanking said rows of connecting bars, totalizing straps whereby adjacent meter bars may be interconnected, and circuit straps for interconnecting the connecting bars and the meter bars.

2. A metering panel, comprising a plurality of connecting bars for the several circuits, said connecting bars being arranged in a row, meter bars arranged in a row parallel to said row of connecting bars, totalizing straps whereby adjacent meter bars may be interconnected, and circuit straps for interconnecting the connecting bars and the meter bars.

3. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, and circuit straps for interconnecting connecting bars to said transverse transfer bars or said meter bars, the same circuit straps being interchangeable for producing either interconnection.

4. A metering panel, comprising a plurality of connecting bars for the several circuits, said connecting bars being arranged in a row, meter bars arranged in rows parallel to and flanking said row of connecting bars, transfer bars transverse to said row of connecting bars, and circuit straps for interconnecting connecting bars to said transverse transfer bars or said meter bars, the same circuit straps being interchangeable for producing either interconnection.

5. A metering panel, comprising a plurality of connecting bars for the several circuits, said connecting bars being arranged in a plurality of rows, meter bars arranged in rows parallel to and flanging said rows of connecting bars, transfer bars transverse to said rows of connecting bars, and circuit straps for interconnecting connecting bars to said transverse transfer bars or said meter bars.

6. A metering panel, comprising a plurality of connecting bars for the several circuits, said connecting bars being arranged in a row, meter bars arranged in rows parallel to and flanging said row of connecting bars, transfer bars transverse to said row of connecting bars, and circuit straps for interconnecting connecting bars to said transverse transfer bars or said meter bars.

7. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, the same circuit straps being interchangeable for producing either interconnection, other transfer bars parallel to the rows of connecting bars, and transfer straps for interconnecting said last-named transfer bars and other bars.

8. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse transfer bars or said meter bars, the same circuit straps being interchangeable for producing either interconnection, other transfer bars parallel to the row of connecting bars, and transfer straps for interconnecting said last-named transfer bars and other bars.

9. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, other transfer bars parallel to the rows of connecting bars, and transfer straps for interconnecting said last-named transfer bars and other bars.

10. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse transfer bars or said meter bars, other transfer bars parallel to the row of connecting bars, and transfer straps for interconnecting said last-named transfer bars and others of the bars.

11. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, the same circuit straps being interchangeable for producing either interconnection, two rows of other transfer bars parallel and flanking the rows of connecting bars, and transfer straps for interconnecting said parallel transfer bars and others of the bars.

12. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse transfer bars or said meter bars, the same circuit straps being interchangeable for producing either interconnection, two rows of other transfer bars parallel and flanking the row of connecting bars, and transfer straps for interconnecting said parallel transfer bars and others of the bars.

13. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, two rows of other transfer bars parallel and flanking the rows of connecting bars, and transfer straps for interconnecting said parallel transfer bars and others of the bars.

14. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse transfer bars or said meter bars, two rows of other transfer bars parallel and flanking the row of connecting bars, and transfer straps for interconnecting said parallel transfer bars and others of the bars.

15. A metering panel, comprising a plurality of connecting bars for the several circuits, said connecting bars being arranged in a plurality of rows, meter bars arranged in rows parallel to and flanking said rows of connecting bars, circuit straps for interconnecting the connecting bars and the meter bars, transfer bars parallel to the rows of connecting bars, and transfer straps for interconnecting said transfer bar and others of the bars.

16. A metering panel, comprising a plurality of connecting bars for the several circuits, said connecting bars being arranged in a row, meter bars arranged in rows parallel to and flanking said row of connecting bars, circuit straps for interconnecting the connecting bars and the meter bars, transfer bars parallel to the row of connecting bars, and transfer straps for interconnecting said transfer bar and others of the bars.

17. A metering panel, comprising a plurality of connecting bars for the several circuits, said connecting bars being arranged in a plurality of rows, meter bars arranged in rows parallel to and flanking said rows of connecting bars, circuit straps for interconnecting the connecting bars and the meter bars, two rows of transfer bars parallel to the rows of connecting bars, and transfer straps for interconnecting said transfer bars and others of the bars.

18. A metering panel, comprising a plurality of connecting bars for the several circuits, said connecting bars being arranged in rows, meter bars arranged in rows parallel to and flanking said row of connecting bars, circuit straps for interconnecting the connecting bars and the meter bars, two rows of transfer bars parallel to the row of connecting bars, and transfer straps for interconnecting said transfer bars and others of the bars.

19. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, binding screws on said several bars, the binding screws on the connecting bars being equidistant from those on the adjacent meter bars and transverse transfer bars, and circuit straps for joining said binding screws.

20. A metering panel, comprising a plurality of connecting bars for the several circuits, said connecting bars being arranged in a row, meter bars arranged in rows parallel to and flanking said row of connecting bars, transfer bars transverse to said row of connecting bars, binding screws on said several bars, the binding screws on the connecting bars being equidistant from those on the adjacent meter bars and transverse transfer bars, and circuit straps for joining said binding screws.

21. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, the same circuit straps being interchangeable for producing either interconnection, other transfer bars parallel to the rows of connecting bars, binding screws on the meter bars and on transfer bars of both kinds, the binding screw on a parallel transfer bar being equidistant from those on the adjacent meter bar and the adjacent transverse transfer bars, and transfer straps for joining said binding screws.

22. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse transfer bars or said meter bars, the same circuit straps being interchangeable for producing either interconnection, other transfer bars parallel to the row of connecting bars, binding screws on the meter bars and on transfer bars of both kinds, the binding screw on a parallel transfer bar being equidistant from those on the adjacent meter bar and the adjacent transverse transfer bars, and transfer straps for joining said binding screws.

23. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, the same circuit straps being interchangeable for producing either interconnection, two rows of other transfer bars parallel and flanking the rows of connecting bars, binding screws on the meter bars and on transfer bars of both kinds, the binding screw on a parallel transfer bar being equidistant from those on the adjacent meter bar and the adjacent transverse transfer bars, and transfer straps for joining said binding screws.

24. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse bars or said meter bars, the same circuit straps being interchangeable for producing either interconnection, two rows of other transfer bars parallel and flanking the row of connecting bars, binding screws on the meter bars and on transfer bars of both kinds, the binding screw on a parallel transfer bar being equidistant from those on the adjacent meter bar and the adjacent transverse transfer bars, and transfer straps for joining said binding screws.

25. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, circuit straps for interconnecting connecting bars to said transverse transfer bars or said meter bars, the same circuit straps being interchangeable for producing either interconnection, two rows of other transfer bars parallel and flanking the rows of connecting bars, binding screws on the meter bars and on transfer bars of both kinds, the binding screw on a parallel transfer bar being equidistant from those on the adjacent meter bar and the adjacent transverse transfer bars and also from those on the next parallel transfer bar, and transfer straps for joining said binding screws.

26. A metering panel, comprising a plurality of connecting bars for the several circuits, said connecting bars being arranged in a row, meter bars arranged in rows parallel to and flanking said row of connecting bars, transfer bars transverse to said row of connecting bars, circuit straps for interconnecting connecting bars to said transverse bars or said meter bars, the same circuit straps being interchangeable for producing either interconnection, two rows of other transfer bars parallel and flanking the row of connecting bars, binding screws on the meter bars and on transfer bars of both kinds, the binding screw on a parallel transfer bar being equidistant from those on the adjacent meter bar and the adjacent transverse transfer bars and also from those on the next parallel transfer bar, and transfer straps for joining said binding screws.

27. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, each of said transverse transfer bars being divisible into a plurality of unconnected parts, and circuit straps for interconnecting connecting bars to said transverse transfer bars or said meter bars.

28. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, each of said transverse transfer bars being divisible into a plurality of unconnected parts, circuit straps for interconnecting connecting bars to said transverse transfer bars or said meter bars, other transfer bars parallel to the rows of connecting bars, and transfer straps for interconnecting said last-named transfer bars and others of the bars and for interconnecting the parts of the several transverse transfer bars.

29. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, each of said transverse transfer bars being divisible into a plurality of unconnected parts, circuit straps for interconnecting connecting bars to said transverse transfer bars or said meter bars, other transfer bars parallel to the rows of connecting bars, and transfer straps for interconnecting said last-named transfer bars and others of the bars and for interconnecting the parts of the several transverse transfer bars, the same transfer strap being interchangeable for producing either interconnection.

30. A metering panel, comprising a plurality of connecting bars for the several circuits, said connecting bars being arranged in a row, meter bars arranged in rows parallel to and flanking said row of connecting bars, transfer bars transverse to said row of connecting bars, each of said transverse transfer bars being divisible into a plurality of unconnected parts, and circuit straps for interconnecting connecting bars to said transverse transfer bars or said meter bars.

31. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, each of said transverse transfer bars being divisible into a plurality of unconnected parts, circuit straps for interconnecting connecting bars to said transverse transfer bars or said meter bars, other transfer bars parallel to the rows of connecting bars, binding screws on the meter bars and on transfer bars of both kinds, the binding screw on a parallel transfer bar being equidistant from those on the adjacent meter bar and the adjacent transverse transfer bars, and the binding screws on adjacent ends of the parts of each transverse transfer bar being spaced apart by the same distance as that separating said other binding screws, and transfer straps for joining said binding screws.

32. A metering panel, comprising a plurality of connecting bars for the several circuits, said connecting bars being arranged in a plurality of rows, meter bars arranged in rows parallel to and flanking said rows of connecting bars, transfer bars transverse to said rows of connecting bars, each of said transverse transfer bars being divisible into a plurality of unconnected parts, circuit straps for interconnecting connecting bars to said transverse transfer bars or said meter bars, other transfer bars parallel to the rows of connecting bars, binding screws on the meter bars and on transfer bars of both kinds, the binding screw on a parallel transfer bar being equidistant from those on the adjacent meter bar and the adjacent transverse transfer bars and also from those on the next parallel transfer bar, and the binding screws on adjacent ends of the parts of each transverse transfer bar being spaced apart by the same distance as that separating said other binding screws, and transfer straps for joining said binding screws.

In witness whereof I have hereunto set my hand at La Grange, Illinois, this first day of November, A. D. one thousand nine hundred and sixteen.

EDWARD F. EDGECOMBE, Jr.

Copies of this patent may be obtained for five cents each, by addressing the "Commissioner of Patents, Washington, D. C."